June 26, 1962 — G. E. GRAY — 3,040,698
INSTRUMENT CONSTRUCTION
Filed July 20, 1959
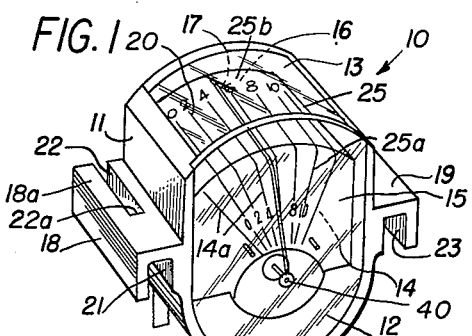
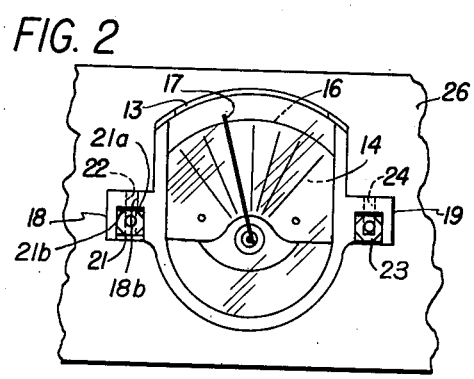
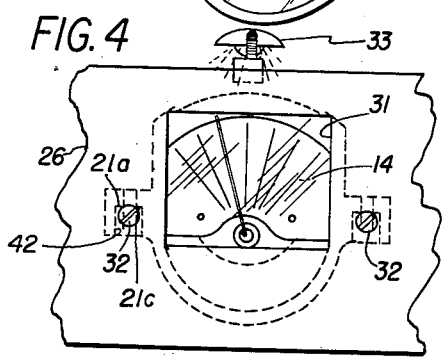
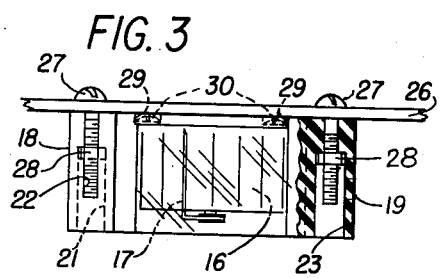
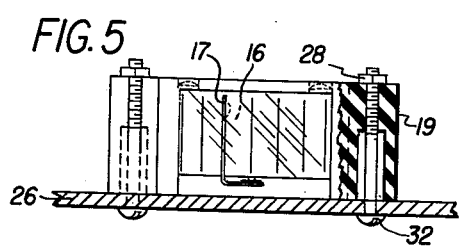
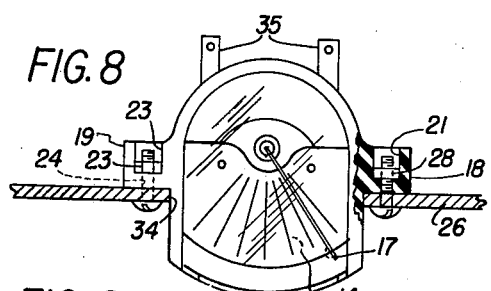
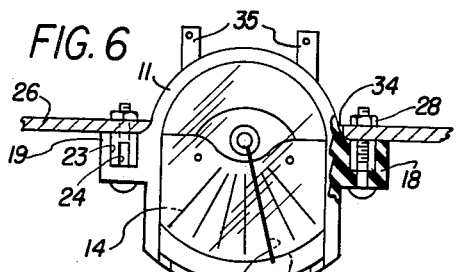
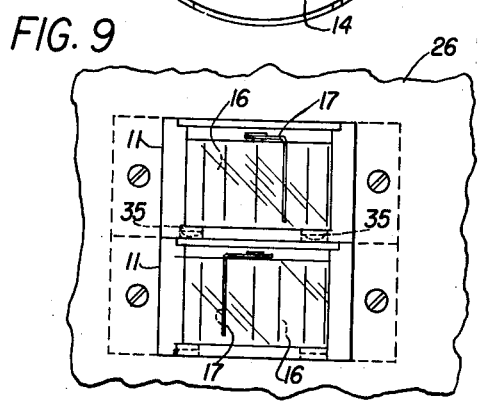
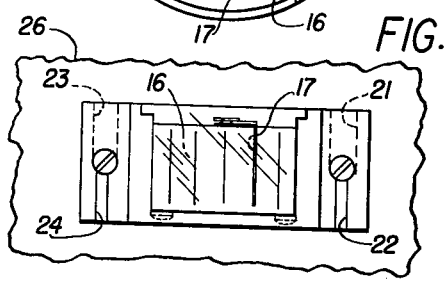
INVENTOR.
Gordon E. Gray
BY Mueller & Aichele
Attys.

United States Patent Office 3,040,698
Patented June 26, 1962

3,040,698
INSTRUMENT CONSTRUCTION
Gordon E. Gray, Western Springs, Ill., assignor to Ralph M. Hill and Gordon E. Gray, La Grange, Ill., a partnership
Filed July 20, 1959, Ser. No. 828,254
9 Claims. (Cl. 116—129)

This invention relates generally to instrument mountings and more particularly to an indicating instrument having an improved housing or case which permits the instrument to be mounted on panels in various positions.

In the prior art, various housings have been provided for encasing instruments which are adapted to be either wall mounted or flush mounted for viewing from the front of the board. However, when variations in board layout from the standard front mounting have proved desirable it has been necessary to specify an instrument encased in a housing particularly designed for mounting in a non-standard manner. This has meant that instrument manufacturers have had to carry a line of several models in order to meet the demand for different instrument board layouts.

According, it is an object of the present invention to provide an instrument housed so as to permit mounting in a plurality of positions and locations on an instrument panel or control board.

Another object of the invention is to provide a universal meter mountable in various positions and which is readable from a plurality of directions.

A further object is to provide a meter housing universally mountable by a variety of standard fasteners, which may be inserted from either the front or rear of a panel without having to provide extra or accessory mounting fixtures for the meter housing.

Still another object is to provide a universal meter which may be illuminated by an external source of light shining from a direction other than from the viewing direction.

A still further object of the present invention is to provide a universal meter mountable without modification in a stacked relationship one upon another, and which is readable from at least one direction while so stacked.

A feature of the present invention is the provision of a meter having window openings so as to visibly expose a scale having faces positioned to be visible and illuminated from a plurality of observation points. The meter is also provided with an index means having a portion shaped to simultaneously indicate a reading on the faces of the scale.

Another feature of the present invention is the provision of a meter housing including mounting lugs having a pair of fastener recesses oppositely disposed therein which overlap in two directions to provide passageways for inserting standard fastening means from either the front, rear, top or bottom thereof.

A further feature of the invention is the provision of a meter housing having parallel flat front and rear surfaces, with terminal leads recessed in the rear surface thereof so that a plurality of meters may be stacked flushly against one another.

Further objects, features, and the attending advantages of the invention will be apparent from a consideration of the following description when taken in connection with the accompanying drawings wherein:

FIG. 1 is a perspective view illustrating the universally mountable meter in accordance with the invention;

FIG. 2 is a front elevational view showing the meter vertically mounted on the front surface of an instrument panel;

FIG. 3 is a plan view partly broken away showing the top of the meter as mounted in FIG. 2;

FIG. 4 is a front elevational view illustrating a vertical mounting of the meter on the rear surface of the instrument panel;

FIG. 5 is a plan view partly broken away showing the top of the meter as mounted in FIG. 4;

FIG. 6 is a top plan view partly broken away illustrating an edgewise manner of mounting the meter on the front surface of the instrument panel;

FIG. 7 is a front elevational view of the meter as mounted in FIG. 6;

FIG. 8 is a top plan view partly broken away showing the meter mounted in the edgewise manner on the rear surface of the instrument panel; and FIG. 9 is a front elevational view of two meters flushly mounted together in a stacked relationship.

In accordance with the invention there is provided an instrument encased in a housing adapted for mounting on, in or behind a conventional instrument panel or control board in a plurality of readable positions. The housing is shaped to fit the particular instrument and is provided with mounting lugs having a pair of grooves extending from opposite ends and opposite sides of the lugs which overlap in both length and depth. The overlap in the grooves forms two mounting holes through the lugs at right angles to one another through which standard fasteners are insertable. By making one of the grooves larger than the other, a well having two shoulders or recessed locking seats is provided for the fastener head or fastening nut. A dial scale is provided having faces at right angles to each other. The faces may be radial or peripheral and may be graduated so that a single pointer may be observed on all the faces. Window openings or transparent portions are arranged to visibly expose the scales for at least bidirectional observation. The instrument is therefore mountable universally and readable from at least two right angle observation points.

Referring now to the drawings, in FIG. 1 there is illustrated a dual faced universally mountable instrument 10 in accordance with the present invention. The instrument is encased by a housing 11 which may be shaped to suit the type of instrument being mounted. In the disclosed embodiment of the invention, an ammeter is shown with the housing 11 compactly conformed thereto by giving it a generally U-shaped configuration, but with the front and rear surfaces 15 and 20 thereof being made flat and parallel.

The front and top surfaces of the housing 11 are enclosed by windows 12 and 13 respectively so as to visibly expose the dial member 25 of the particular instrument encased in the housing 11. The ammeter dial member has front and top portions 25a and 25b in planes at right angles to each other to respectively carry a front reading scale 14 and a top reading scale 16 thereon. The graduations 14a of front scale 14 are radially inscribed to diverge from the axis 40 of the ammeter, and are then carried across the top portion 25b of the dial member so that peripheral scale 16 corresponds with scale 14. The ammeter is provided with an extra long pointer 17 which is bent at right angles to simultaneously sweep over scales 14 and 16 and thereby serve as a dual index readable from either the front 15 or top 20 of the meter.

The scales 14 and 16 are set back from the windows 12 and 13 respectively to allow room for the pointer 17 to pivot therebetween. This set back of the scales may be utilized to advantage in illuminating the scales, since one external source of light, such as an overhead lamp provided at the top of the instrument panel for lighting a plurality of meters, may be positioned to shine through the forward edge of window 13 to illuminate scale 14 as well as scale 16. See FIG. 4. Additional illumination may be achieved by coating the inside surfaces of windows 12 and 13 with a known material, such as that used in one-way mirrors, to reflect incident light rays from scale 16 to scale 14, and vice versa.

Mounting lugs or ears 18 and 19 are provided on either side of the housing 11 for mounting the meter on an instrument panel or control board (not shown). Mounting lug 18 has a groove 21 recessed in the underside thereof which extends from the front thereof lengthwise towards the rear thereof and terminates in a flat surface. Another lengthwise groove 22 is recessed in the upper side 18a of lug 18 and extends forwardly from the rear thereof to terminate in a flat surface located in front of the flat end surface 22a of groove 21. Grooves 21 and 22 are each recessed to a depth so as to overlap one another, and therefore, since they also overlap along the length of the lug 18, a lengthwise hole or passageway will be formed horizontally through the lug 18 having a height dimension dependent upon the amount of overlap in the depths of grooves 21 and 22. In a similar manner the overlap of grooves 21 and 22 in their length dimensions will cause a vertical passageway or hole 18b (FIG. 2) to be formed through the lug 18 having a dimension in the lengthwise direction dependent upon the amount of overlap in the lengths of grooves 21 and 22. Although the length and depth dimensions of grooves 21 and 22 may be varied and yet the bi-dimensional overlapping relationship still maintained, for simplicity of manufacture the depth and length dimensions of the two grooves are normally made the same so that they may be cut with the same jig or machine setting in one quick stroke for each groove.

The width of groove 21 is made larger than the width of groove 22 so that a shoulder 21a (FIG. 2) is formed in the horizontal passageway by the inner end 21b (FIG. 2) of groove 21 and so that another shoulder is formed in the vertical passageway by the upper surface of groove 21. Thus the wider groove 21 will form a well 42 (FIG. 4) having shoulders 21a and 21c (FIG. 4) in the respective passageways or mounting holes which provide a seat for standard fastening means, to be subsequently described.

Mounting lug 19 is likewise provided with a front groove 23 and a rear groove 24 (FIG. 2) having the same dimensions respectively as grooves 21 and 22 of mounting lug 18.

As is illustrated in FIGS. 2 through 9, the double view meter embodiment of the invention may be mounted in a plurality of positions with respect to a vertically disposed instrument panel or control board 26. Thus, in FIGS. 2 and 3 the meter is shown mounted vertically in a conventional manner, like a clock on a wall, to be read from the front of the board 26. To mount the meter in this fashion standard fastening means, such as the machine screws 27 and hexagonal nuts 28, are assembled and seated in the mounting lugs 18 and 19 using the horizontal passageways therethrough. It is to be noted that the screws 27 may be inserted either from the rear of the board 26, as shown in FIG. 3, or from the front of the board to receive the fastening nut 28 at the rear of the board. The grooves 21 and 23 are preferably made with a width dimension corresponding to the standard nut size suitable for mounting the particular instrument so that the flat sides of the recess will bear against the flat sides of the nut to prevent it from turning. Thus, the wider grooves in the mounting lugs serve to hold the nut while mounting the meter as well as to provide a well with a bi-directional seat for the fasteners.

As shown in FIG. 3, a pair of recesses 29 extend downwardly in the rear surface of the housing 11 to provide paths for lead wires or other electrical connections to the ammeter. Non-projecting binding posts or terminals 30 may then be provided in the recesses 29 so that the meter may be flushly mounted against the front surface of the board 26.

The meter as mounted in the conventional manner of FIGS. 2 and 3 provides maximum readability when, for instance, it is located on a lower portion of the control board, since the top scale 16 may be read from above without having to bend over to read the front scale 14. This advantage also obtains when the meter is mounted on the front of small laboratory test equipment and other devices which are commonly used either on a work bench or on a raised shelf.

FIGS. 4 and 5 illustrate how the same meter may be mounted in the vertical manner on the rear of the instrument panel 26. This rear mounting is especially desirable when a "clean" instrument panel is required with no instruments or gauges protruding from the board. An opening 31 is cut in the board 26 so that the front scale 14 will be visibly exposed and machine screws 32 are used which are longer than the front mounting screws 27. When the meter is thus mounted, the front scale may be illuminated by an external light source, such as lamp 33, located above the meter at the rear of the instrument board 26. This rear lighting is especially suitable for installations where it is desired to minimize the amount of light which shines through the front of the instrument board. Also, this type of mounting is preferable for an instrument board design where a plurality of meters are mounted thereon to be readable both from the front of the board by a person standing on the same elevation as the instrument panel and from the rear of the board at a higher elevation, such as from a catwalk platform on the next elevation above the instrument panel.

The meter encased in the housing of the invention is also mountable in an edgewise manner, as illustrated in FIGS. 6 through 9. For this type of mounting an opening 34 is provided in the instrument panel 26 through which the meter is inserted from the front of the board, as shown in the top view of FIG. 6. Also, a pair of flat lead strips 35 may be fastened to the binding posts 30 in the recesses 29 to protrude beyond the housing 11. However, no modification of the mounting lugs 18 and 19 is necessary in order to achieve this edgewise mounting. It is to be noted (FIG. 7) that now the passageway formed by the overlap in the length dimensions of grooves 21 and 22 of mounting lug 18 is utilized to receive the standard fastening means to mount the meter. The radially graduated scale 14 becomes the top reading scale while the peripheral scale 16 becomes the front reading scale.

The edgewise manner of mounting the ammeter with the lead strips 35 attached is especially suitable for installations where it is desired to have the electrical connections to the meter at the rear of the instrument panel 26 but where the scales must protrude from the front of the panel for maximum readability.

The meter may also be mounted in the edgewise manner from the rear of the board 26 so as to protrude and be readable in two directions from the front thereof, as is shown on top view of FIG. 8. When thus mounted the wider groove 21 of the mounting lug 18 and the corresponding groove 23 of lug 19 serve as holding receptacles for the hexagonal nuts 28. Since a portion of the radially graduated scale 14 extends through to the rear of the board 26, this scale may also be illuminated for front reading from an external light source mounted above the meter at the rear of board in a manner similar to that shown in FIG. 4.

In FIG. 9 one method of mounting the meters against one another in a stacked relationship is illustrated by two meters mounted on the rear of the board 26 in the manner of FIG. 8. As previously described, the terminal lead strips 35 are mounted in a recessed portion on the back of the meter so that a flat surface is presented thereby which will permit the flush stacking in the back to front manner of FIG. 9.

Although the above described mounting positions of the meter have been disclosed with respect to a vertically disposed control board or instrument panel, it will be obvious that the relative positioning of the instrument with the panel in accordance with the invention may be utilized to advantage on boards or panels horizontally or othewise disposed. For example, the meter could be inserted edgewise through a horizontal panel and mounted in an inverted manner from that of FIG. 8 to extend upward (as in FIG. 1) for observation from above the panel.

By providing both a peripheral scale and a radial scale, and utilizing a housing as disclosed herein, a universally mountable instrument is provided. This can be offered by instrument manufacturers without the necessity of carrying an inventory composed of many models of non-standard instruments designed for special applications. With the instrument mounting of the invention one model may be offered which will allow the designers of instrument panels to create a variety of layouts and arrangements of meters and controls thereon as best suits their individual needs. For some applications, readability may be further enhanced by providing reciprocal scales, adding a double ended index and an oppositely disposed peripheral scale, and by utilizing a completely transparent housing. This will be made possible by the meter disclosed above at no more cost than a meter housed for mounting in the traditional clock-on-the-wall style.

I claim:

1. A universally mountable dial indicating instrument including in combination, a housing for said instrument having a transparent portion, mounting lugs provided on said housing having recesses formed therein to define first and second mounting holes therethrough at angles to each other to receive fastening means for mounting said instrument in first and second positions respectively on an instrument panel, dial means for said instrument having first and second graduated scales positioned to be observed through said transparent portion and extending at an angle with respect to each other to be respectively observable in said first and second positions of said instrument, and indicator means movable with respect to said scales to provide a simultaneous indication on said scales.

2. An instrument assembly universally mountable on an instrument panel including in combination, an instrument, a housing for said instrument having right angularly positioned transparent portions, mounting lugs provided on said housing having recesses formed therein to define first and second mounting holes therethrough at substantially right angles to each other to receive fastening means for mounting said instrument assembly in one of a plurality of parallel and right angle positions with respect to the instrument panel, dial means for said instrument having a pair of graduated scales spaced from said transparent portions with at least one of said scales positioned to be viewed therethrough in each of said positions, said dial means also having an indicator means adapted to provide a simultaneous indication on said scales, and a light source positioned to illuminate said dial means by shining through one of said transparent portions.

3. A universally mountable instrument including in combination dial means having scales thereon at substantially right angles to each other, index means adapted to simultaneously indicate a corresponding reading on said scales, a housing for said instrument having windows therein for visibly exposing said scales, mounting lugs provided on said housing with each of said mounting lugs having first and second parallel recesses therein disposed transversely to said scales, said first recess being formed in an exposed surface of said lug and extending from one end thereof inwardly a distance greater than half the length thereof and having a depth greater than half of the height thereof, said second recess being formed in an opposite exposed surface of said lug and extending from the opposite end of said lug inwardly towards said first recess and having depth and length dimensions so that said second recess overlaps said first recess in both of said depth and length dimensions, with one of said recesses having a larger width dimension than the other of said recesses whereby said instrument may be mounted in a plurality of positions by fastening means insertable through said recesses in said mounting lugs, with said one recess receiving and retaining an enlarged portion of the fastening means.

4. A universally mountable housing for an instrument having dial means, said housing having window means therein for visibly exposing said dial means, said housing including parallel mounting portions having first and second parallel recesses therein disposed transversely to said dial means, said first recess being in an exposed surface of said mounting portion and extending from one end thereof inwardly a distance greater than half the length thereof and having a depth greater than half the height thereof, said second recess being in an opposite exposed surface of said mounting portion and extending from the opposite end of said mounting portion towards said first recess and having depth and length dimensions so that said second recess overlaps said first recess in both of said depth and length dimensions, with one of said recesses having a larger width dimension than the other recess whereby said instrument may be mounted in a plurality of positions by fastening means insertable through said recesses and retained by said mounting portions and yet be readable from at least two right angle observation directions.

5. A universally mountable instrument including in combination, dial means having correspondingly graduated scales thereon in planes at right angles to each other, index means adapted to simultaneously indicate on said scales, a housing for said instrument having a pair of flat parallel mounting surfaces, said housing also having windows therein arranged for visibly exposing said scales, elongated rectangular mounting lugs provided on said housing between the planes of said mounting surfaces and extending normal thereto and with each of said mounting lugs having first and second rectangular recesses therein, said first recess being in an exposed surface of said lug and extending from one end thereof inwardly a distance greater than half the length thereof and having a depth greater than half of the height thereof, said second recess being in an opposite exposed surface of said lug and extending from the opposite end of said lug inwardly and having the same depth and length dimensions as said first recess so that said second recess overlaps said first recess by a predetermined amount in both of said depth and length dimensions to form two rectangular mounting passageways through said lug, said second recess having a larger width dimension than said first recess to provide a rectangular well having two flat mounting shoulders in said second recess, whereby said instrument may be mounted in a plurality of positions in separate or stacked relationship with one of said surfaces being against a panel adapted to receive fastening means inserted through said mounting passageways and retained by said lugs.

6. A universally mountable instrument including in combination, a dial member having two corresponding scales in planes at right angles to each other to serve as front and top scales, a pointer having one end thereof bent at right angles so as to sweep over both of said scales, a housing for said instrument having windows therein spaced from said scales for visibly exposing said scales, mounting lugs provided on either side of said housing extending parallel to said top scale, each of said mounting lugs having a front rectangular groove in one surface and a rear rectangular groove in the opposite surface thereof being aligned and parallel with said front groove, said front groove extending from the front face of said lug rearwardly a distance greater than half the length of said lug and having a depth greater than half the height of said lug, said rear groove extending from the rear face of said lug forwardly and having the same height and length dimensions as said front groove so as to overlap the same and thereby form two mounting passageways at right angles through said lug, said front groove having a larger width dimension than said rear groove to provide flat mounting shoulders therein in each of said passageways, whereby said instrument may be mounted in a plurality of positions on a panel with one of said scales parallel to said panel by fastening means inserted through the one of said passageways normal to said panel and yet be readable from two right angle directions.

7. A universally mountable instrument including in combination, dial means having portions arranged to be observable from different directions, index means for the instrument having portions arranged to simultaneously indicate on said portions of said dial means, a housing for said instrument having transparent means therein for visibly exposing said dial means, and mounting portions provided on said housing for mounting said instrument on a panel with each of said mounting portions having first and second parallel overlapping recesses therein, said first recess extending a given length and depth from exposed surfaces of said mounting portion, said second recess extending a given length and depth from respective opposite exposed surfaces of said mounting portion towards said first recess so that said second recess overlaps in both of its length and depth dimensions with said first recess to form mounting passageways through said mounting portion corresponding to the different observation directions, whereby said instrument may be mounted in a plurality of positions on said panel by fastening means insertable through said mounting passageways to be readable from at least the observation directions.

8. A universally mountable instrument including in combination, dial means having portions at right angles to one another, a housing for said instrument having transparent means therein for visibly exposing said dial means, and mounting portions provided on said housing with each of said mounting portions having first and second parallel recesses therein, said first recess extending into said mounting portion for a given length and depth from exposed surfaces of said mounting portion, said second recess extending from respective opposite exposed surfaces of said mounting portion inwardly towards said first recess and having length and depth dimensions formed so that said second recess overlaps in both of its length and depth dimensions with said first recess to form mounting passageways each extending through said mounting portion in a direction transverse to different ones of said portions of said dial means, said second recess having a width dimension larger than the width dimension of said first recess to form retaining shoulders in said second recess for each of said passageways, whereby said instrument may be mounted in a plurality of positions on a panel by fastening means inserted through said passageways and retained by said mounting portions to be readable from at least two right angle observation directions corresponding to the directions of said passageways.

9. A lug for mounting an indicating instrument on a panel with an external surface of said instrument disposed transversely to said panel, said lug being adapted to project from said external surface and having first and second parallel grooves formed therein transverse to said panel, said first and second grooves being respectively recessed by predetermined distances from opposite exposed surfaces of said lug so that said grooves intersect with one another in depth and length by a predetermined amount, the intersection in depth of said grooves forming one passage through both grooves of said lug for receiving fastening means adapted to secure said instrument in one position on said panel, and the intersection in length of said grooves forming another passage through both grooves of said lug for receiving said fastening means to mount said instrument in another position on said panel.

References Cited in the file of this patent
UNITED STATES PATENTS

| | | |
|---|---|---|
| 1,431,776 | Colvin | Oct. 10, 1922 |
| 2,022,175 | Allee | Nov. 26, 1935 |
| 2,228,497 | Witchger | Jan. 14, 1941 |
| 2,562,260 | Caldwell | July 31, 1951 |
| 2,597,939 | Lamb | May 27, 1952 |